United States Patent
Hjortstam et al.

(10) Patent No.: US 11,798,711 B2
(45) Date of Patent: Oct. 24, 2023

(54) INSULATOR WITH RESISTIVITY GRADIENT

(71) Applicant: Hitachi Energy Switzerland AG, Baden (CH)

(72) Inventors: Olof Hjortstam, Västerås (SE); Henrik Lofas, Skultuna (SE); Henrik Hillborg, Västerås (SE); Nils Lavesson, Örebro (SE); Magnus Svanberg, Norrfjärden (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 520 days.

(21) Appl. No.: 17/255,486

(22) PCT Filed: Jul. 2, 2019

(86) PCT No.: PCT/EP2019/067757
§ 371 (c)(1),
(2) Date: Dec. 23, 2020

(87) PCT Pub. No.: WO2020/007871
PCT Pub. Date: Jan. 9, 2020

(65) Prior Publication Data
US 2021/0272723 A1  Sep. 2, 2021

(30) Foreign Application Priority Data
Jul. 2, 2018  (EP) .................................... 18181158

(51) Int. Cl.
*H01B 17/26* (2006.01)
*C09J 133/08* (2006.01)
(Continued)

(52) U.S. Cl.
CPC ............ *H01B 17/26* (2013.01); *C09J 133/08* (2013.01); *H01B 17/325* (2013.01); *H01B 19/04* (2013.01);
(Continued)

(58) Field of Classification Search
CPC ....... H01B 17/26; H01B 17/42; H01B 17/325
See application file for complete search history.

(56) References Cited

U.S. PATENT DOCUMENTS

| | | | | |
|---|---|---|---|---|
| 4,217,466 A | * | 8/1980 | Kuhl | H01B 17/32 174/209 |
| 4,373,113 A | * | 2/1983 | Winkler | B29C 45/14549 264/254 |

(Continued)

FOREIGN PATENT DOCUMENTS

| | | |
|---|---|---|
| CA | 2046682 A1 | 2/1992 |
| CN | 2655393 Y | 11/2004 |

(Continued)

OTHER PUBLICATIONS

International Search Report and Written Opinion of the International Searching Authority, PCT/EP2019/067757, dated Sep. 5, 2019, 13 pages.

(Continued)

*Primary Examiner* — Sherman Ng
(74) *Attorney, Agent, or Firm* — Sage Patent Group (57) ABSTRACT

A composite insulator includes an insulating elongated core, a protective layer surrounding the elongated core, the protective layer including an outer surface with a shed profile and an adhesive primer layer disposed between the elongated core and the protective layer for adhering the protective layer to the elongated core, the adhesive primer layer including a coupling agent and particles of a low resistivity material. The method for producing a composite insulator includes preparing a first solution including a solvent, a coupling agent and particles of a low resistivity material, applying the first solution on at least a part of an envelope surface of an insulating elongated core and thus forming one or more first adhesive primer layers and applying a protective layer onto the first adhesive primer layer on the elongated core, wherein the protective layer includes an outer surface with a shed profile.

12 Claims, 3 Drawing Sheets

(51) Int. Cl.
*H01B 17/32* (2006.01)
*H01B 19/04* (2006.01)
*C08K 3/04* (2006.01)
*C08K 3/22* (2006.01)
*C08K 3/34* (2006.01)

(52) U.S. Cl.
CPC .............. *C08K 3/042* (2017.05); *C08K 3/22* (2013.01); *C08K 3/34* (2013.01); *C08K 2003/2241* (2013.01); *C08K 2003/2248* (2013.01); *C08K 2003/2251* (2013.01); *C08K 2003/2272* (2013.01); *C08K 2003/2275* (2013.01); *C08K 2003/2296* (2013.01)

(56) References Cited

U.S. PATENT DOCUMENTS

| | | | |
|---|---|---|---|
| 4,440,975 A | | 4/1984 | Kaczerginski |
| 4,505,033 A | * | 3/1985 | Wheeler ................ B29C 43/18 174/152 R |
| 6,342,679 B1 | * | 1/2002 | Portas ................... H02G 15/068 174/209 |
| 7,262,367 B2 | | 8/2007 | Donzel et al. |
| 8,637,769 B2 | * | 1/2014 | Denndoerfer ........ H01B 17/325 174/73.1 |
| 2010/0200274 A1 | * | 8/2010 | Jonsson ................. B29C 70/58 174/137 B |
| 2011/0017488 A1 | | 1/2011 | Denndorfer et al. |

FOREIGN PATENT DOCUMENTS

| | | |
|---|---|---|
| CN | 101877258 A | 11/2010 |
| CN | 102140310 A | 8/2011 |
| DE | 102012104137 A1 | 11/2013 |
| EP | 1577904 A1 | 9/2005 |
| FR | 2511180 A1 | 2/1983 |
| JP | H11273474 A | 10/1999 |
| JP | 2001126562 A | 5/2001 |

OTHER PUBLICATIONS

International Preliminary Report on Patentability of the International Preliminary Examining Authority, PCT/EP2019/067757, dated Jun. 19, 2020, 7 pages.
Extended European Search Report dated Dec. 18, 2018 for European Patent Application No. 18181158.9, 8 pages.
Chinese First Office Action dated Feb. 14, 2022 for Chinese Patent Application No. 201980044691.6, 9 pages (including English summary).

* cited by examiner

INSULATOR WITH RESISTIVITY GRADIENT

CROSS-REFERENCE TO RELATED APPLICATIONS

This application is a 35 U.S.C. § 371 national stage application of PCT International Application No. PCT/EP2019/067757 filed on Jul. 2, 2019, which in turns claims foreign priority to European Patent Application No. 18181158.9, filed on Jul. 2, 2018, the disclosures and content of which are incorporated by reference herein in their entirety.

TECHNICAL FIELD

The present invention relates to a composite insulator and a method for producing the same.

BACKGROUND

A frequently used type of insulator are hollow core insulators, consisting of a fiber reinforced epoxy cylindrical or tapered elongated core, combined with a silicone rubber housing exhibiting various types of shed profiles. The two ends of an insulator separate two different voltages, for example Ground and the DC system voltage. Under DC voltage the electric field distribution inside and around composite insulators depends on the resistivity and the geometrical shape of all insulation materials, including the surrounding air. The sheds are designed to increase the surface flashover distance along the insulator. However, local variations in the electric field in the insulators may lead to partial discharges when leakage paths develop which reduces the life span of the materials in the insulators or results in a final catastrophic failure of the insulator due to surface flashover or puncture of the insulator.

High voltage insulators can for example use shielding electrodes attached to the voltage-carrying fittings to avoid increases in the electric field at the ends of the fittings.

US 2011/0017488 A1 explains that the materials of an insulator are severely loaded by an inhomogeneous distribution of an electric field over its surface. One of the reasons is the structural configuration of the insulator. Particularly in the area of the fittings, the field strength varies because of the transition from the insulating materials of the sheds and of the insulator core to a metallic material, because of the transition to the ground potential on the mast, tower or pole cross member and to the conductor potential, where the conductor cables are attached. In order to prevent a local field disturbance caused thereby, in particular field strength peaks, it is possible to use so-called geometric field control. The geometry of the workpieces, in particular live parts, is smoothed out by rounding corners and edges. The document shows a composite insulator, comprising a core, a protective layer surrounding the core, and a field control layer disposed between the core and the protective layer in at least one section of the insulator. The field control layer has a stratum with a length, and the field control layer contains a proportion of particles, as a filler, influencing an electric field of the insulator. The proportion of the particles influencing the electric field differs over the length of the stratum. The field control layer is generally composed of the same material as the protective layer covering it.

DE102012104137 A1 discloses that localized coatings or coatings of insulating materials, such as polymers, can be applied as field control layers with intercalations of dielectric and/or ferroelectric materials as a means of homogenizing the electric field and avoiding local field disturbance. The document discusses using plasma coating techniques which allows a resistive material or mixture of resistive materials to be applied directly to the core of a composite insulator and also different geometric structures of the field control layer such as stripes.

The production methods of insulators with electric field control layers requires many steps which are time consuming and can be expensive in terms of time and equipment needed.

SUMMARY

It is an aim of the present invention to at least partly overcome the above problems, and to provide an improved composite insulator.

The present disclosure aims to provide a composite insulator with a time and cost-effective manufacturing process and which exhibit desired properties in robustness and the electric field profile.

This aim is achieved by the device as defined in claim 1 and the method defined in claim 13.

According to an embodiment of the disclosure, it comprises a composite insulator, comprising an insulating elongated core, a protective layer surrounding the elongated core, the protective layer comprising an outer surface with a shed profile, and an adhesive primer layer disposed between the elongated core and the protective layer for adhering the protective layer to the core, the adhesive primer layer comprising a coupling agent and particles of a low resistivity material. In other words, the adhesive primer layer, which provides robustness to the insulator by providing good adhesion between the core and the protective layer, is also an electric field controlling layer. The protective layer is of a high resistivity material. A composite insulator is provided, which simultaneously exhibits a low resistivity/resistance at the base and high resistivity at the shed tips as well as provides a robust structure which is easy to manufacture. In other words, the resistivity is lowered axially but kept high where the protective layer meets air. This will lead to a more homogeneous electric field distribution under DC stress and hence higher dielectric withstand. The electric field towards the surroundings is thus controlled with the help of leakage currents in the system by designing a leakage current axially.

According to some aspects, the composite insulator is for high-voltage direct current, HVDC, applications, and wherein the particles of a low resistivity material are distributed in the whole adhesive primer layer. Under DC stress such a low resistive layer will cause a well-controlled leakage current along the axial direction of the primer layer. The leakage current will provide a controlled field distribution along the axial direction of the insulator. A controlled field distribution can contribute to a reduction of the maximal electrical stress. By reducing the maximal electrical stress, the device gets more reliable.

According to some aspects, the particles of a low resistivity material are evenly distributed in the whole adhesive primer layer. This simplifies the manufacturing process since the adhesive primer layer can be applied in the same manner over the whole core. For example, the adhesive primer layer can be applied in one solution by painting, dipping, or spraying the whole elongated core and then evaporating the solvent. An even particle distribution will provide a more homogeneous field distribution along the axial direction of the insulator, compared to an uneven distribution.

According to some aspects, at least part of the adhesive primer layer comprises the particles of a low resistivity material and at least part of the adhesive primer layer is free of the particles of a low resistivity material. In the ends of the insulator, where fittings may be arranged, there may be a transition from insulating material to a metal material, a transition from ground potential or a transition to a conductor potential. In this area the electric field strength in an insulator is especially affected. Using an adhesive primer layer infused with particles of a low resistivity material in this area stabilizes the electric field and reduces discharges.

According to some aspects, wherein the surface resistivity of the adhesive primer layer comprising particles of a low resistivity material is between $10^8$ and $10^{14}$ Ω/square, and preferably between $10^{10}$ and $10^{12}$ Ω/square. The total resistivity is, according to some aspects, between $10^9$ and $10^{15}$ Ω preferably between $10^{11}$ and $10^{13}$ Ω.

According to some aspects, the particles of the low resistivity material comprises particles of any of, or a combination of: $Cr_2O_3$ iron oxides, such as $Fe_2O_3$ or $Fe_3O_4$, $TiO_2$, ZnO, ZnO microvaristors, SiC, CuO, Carbon Black, graphene/graphite oxide and thermally reduced graphene/graphite oxide. The specific combination will be based on the desired resistivity of the final adhesive layer.

According to some aspects, the proportion of particles of a low resistivity material in the adhesive primer layer is high enough for creating a percolated particle network and <40 vol %. It should be noted that this value is for dry adhesive primer layer and not straight after application of it, when the adhesive primer layer has not yet dried.

According to some aspects, the adhesive primer layer has a thickness of between 0.01 and 500 micrometer, and preferably between 0.1 and 100 micrometer. It should be noted that this also, is a value for dry adhesive primer layer; i.e. dry film thickness. There is a relationship between the thickness of the adhesive primer layer and the proportion of particles of a low resistivity material. To reach a desired electric field profile for the insulator, a thin layer with a higher proportion of particles may give the same electric field profile as a thicker layer with a lower proportion of particles. A thin layer may be desirable for materials savings reasons but then there might be a need for such a high proportion of particles of a low resistivity material so that the adhesion properties are not good enough for robustly adhering the protective layer. So, according to some aspects, when designing the insulator, the proportion of particles of a low resistivity material and the thickness of the adhesive primer layer will be jointly determined.

According to some aspects, the coupling agent comprises at least one of: silanes, titanates, orthosilicate esters or metal orthoesters. These are good coupling agents between, for example, inorganic fibers to polymer matrices by the creation of covalent bonds. In other words, silanes can coat fibers to create better adhesion to a polymer matrix.

According to some aspects, the protective layer comprises a high resistivity polymeric base material. The protective layer comprises a high resistivity material such that it is not conducting in the insulator. Polymeric base material is chosen depending on characteristics. A non-reactive, stable insulating material is desirable in the insulator.

According to some aspects, protective layer comprises silicone rubber. Silicone rubber has good resistance to extreme temperatures and operate normally from −55 to 300° C. Silicone rubber also offers high tear strength and high dielectric strength at high voltage. Silicone rubber is also hydrophobic, which is useful when the insulator is used in an environment where it can get wet, for example by rain.

According to some aspects, the elongated core comprises a glass fiber reinforced composite tube. A glass fiber reinforced composite tube is a light weight, robust and cheap insulating elongated core.

According to an embodiment of the disclosure, it comprises a method for producing a composite insulator. The method comprises preparing a first solution comprising a solvent, a coupling agent and particles of a low resistivity material, applying the first solution on at least a part of an envelope surface of an insulating elongated core and thus forming one or more first adhesive primer layers and applying a protective layer onto the first adhesive primer layer on the elongated core, wherein the protective layer comprises an outer surface with a shed profile. This method provides an efficient method, without many and complicated steps, for producing the composite insulator discussed above. The advantages of the resulting composite insulator have been previously discussed.

According to some aspects, applying the first solution comprises spraying, dipping, or painting the first solution onto the envelope surface of the elongated core. Spraying, dipping or painting are efficient methods to apply the first adhesive primer layer which does not require any complicated or expensive equipment.

According to some aspects, the first solution is applied on one or more parts of the envelope surface. The method comprises applying a second solution, the second solution comprising the solvent and the coupling agent and is without the particles of a low resistivity material, on the remaining parts of the envelope surface thus forming one or more second adhesive primer layers and wherein the protective layer is applied onto the first and second adhesive primer layers. Thus, there is adhesive primer layer over the whole envelope surface and at least one part of the adhesive primer layer comprises particles of a low resistivity material and at least one part of the adhesive primer layer does not comprise any particles of a low resistivity material. It should be noted that the term "whole envelope surface" means the parts where the protective layer will be placed and may exclude some part in the ends. The ends may for example be cut off after production or be used to fasten the insulator upon installation and does then not need any adhesive primer layer.

According to some aspects, applying the second solution comprises spraying, dipping or painting the second solution onto the envelope surface of the elongated core. Hence, when there is adhesive primer layer over the whole surface of the elongated core, some parts with particles of a low resistivity material and some parts without, the different parts can be applied separately with for example spraying or painting.

BRIEF DESCRIPTION OF THE DRAWINGS

The invention will now be explained more closely by the description of different embodiments of the invention and with reference to the appended figures.

DETAILED DESCRIPTION

Aspects of the present disclosure will be described more fully hereinafter with reference to the accompanying drawings. The device and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Unless otherwise defined, all terms used herein have the same meaning as commonly understood by one of ordinary skill in the art to which this disclosure belongs.

Figure 1:
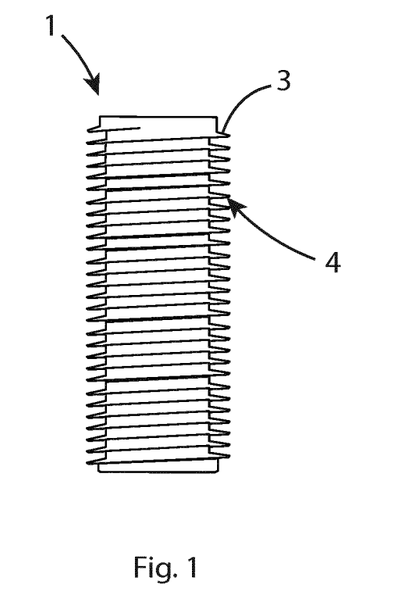
FIG. 1 shows a perspective view of a composite insulator with a shed profile.
Figure 2:
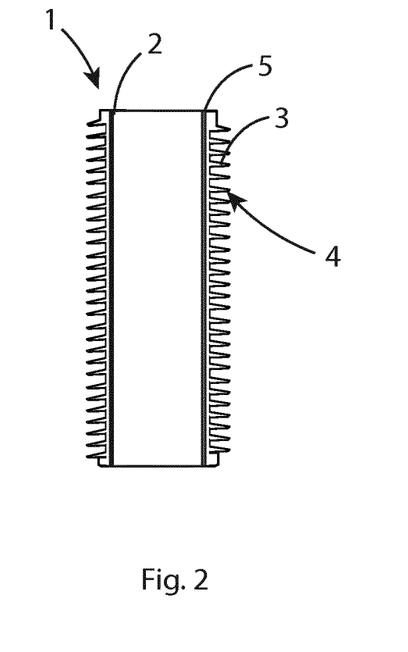
FIG. 2 shows a cross section of a composite insulator with an adhesive primer layer.

FIG. 1 shows a perspective view of a composite insulator 1 with a shed profile. FIG. 2 shows a cross section of a composite insulator 1 according to some aspects of the disclosure.

FIG. 2 illustrates a composite insulator 1, comprising an insulating elongated core 2 and a protective layer 3 surrounding the elongated core 2. The protective layer 3 comprising an outer surface 4 with a shed profile. The shed profile is illustrated in FIGS. 1 and 2. The shed profile comprises either a series of concentric disc shapes or concentric disc shapes that are continuously connected and thus forms a spiral along the elongated core 2. The sheds, i.e. the disc shapes, can have different radiuses or the same radius with respect to each other. The size and shape required for the sheds will depend on the use and is thus up to the system designer to choose. The diameter and length of the elongated core 2 is also up to the system designer when using the composite insulator 1.

Figure 6:
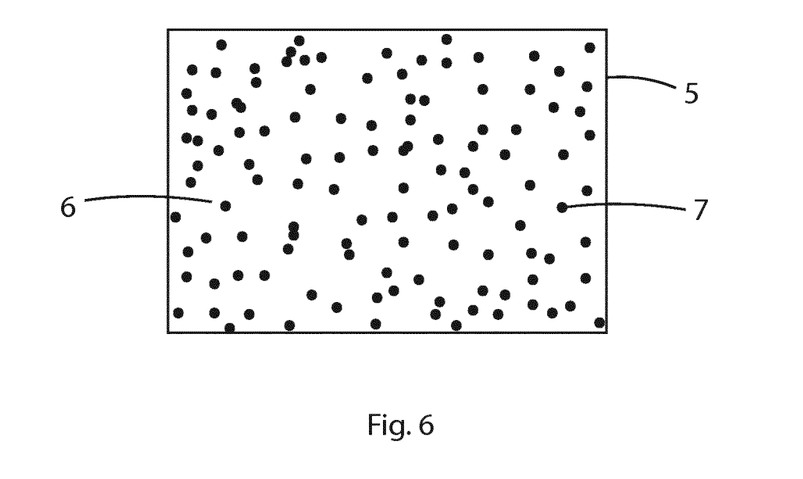
FIG. 6 illustrates an enlarged view of an adhesive primer layer comprising a coupling agent and particles of a low resistivity material.

An adhesive primer layer 5 is disposed between the elongated core 2 and the protective layer 3 for adhering the protective layer 3 to the core, the adhesive primer layer 5 comprising a coupling agent 6 and particles 7 of a low resistivity material. See FIG. 6 for an enlarged view of a part of the adhesive primer layer 5 with the coupling agent 6 and particles 7. In other words, the adhesive primer layer 5, which provides robustness to the insulator by providing good adhesion between the core and the protective layer 3, is also an electric field controlling layer. The protective layer 3 is of a high resistivity material. A composite insulator 1 is provided, which simultaneously exhibits a low resistivity/resistance at the base and high resistivity at the shed tips as well as provides a robust structure which is easy to manufacture. In other words, the resistivity is lowered axially but kept high where the protective layer 3 meets air. This will lead to a more homogeneous electric field distribution under DC stress and hence higher dielectric withstand. The electric field towards the surroundings is thus controlled with the help of leakage currents in the system by designing a leakage current axially. Adding low resistive particles into the adhesive primer layer 5 will reduce the effective resistivity of the coupling agent 6. The reduced resistivity will cause an increased leakage current in the axial direction of the primer layer. If the leakage current in the primer is substantially larger than the leakage current in the surrounding media it will, according to ohm's law, determine the axial field distribution.

The composite insulator 1 is, according to some aspects, for high-voltage direct current, HVDC, applications, and the particles 7 of a low resistivity material are distributed in the whole adhesive primer layer 5. The presence of particles in the whole adhesive primer layer 5 will provide a reduced resistivity of the primer along the full length of the adhesive primer layer 5s. This will ensure a favourable field distribution. The composite isolator is, for example, a bushing. A bushing is an insulated device that allows an electrical conductor to pass safely through a grounded conducting barrier such as the case of a transformer or circuit breaker. According to some aspects, the particles 7 of a low resistivity material are evenly distributed in the whole adhesive primer layer 5. This simplifies the manufacturing process since the adhesive primer layer 5 can be applied in the same manner over the whole core. For example, the adhesive primer layer 5 can be applied in one solution by painting or spraying the whole elongated core 2 and then evaporating the solvent. An even distribution of particles in the primer will create a constant resistivity of the primer that in turn will provide an even field distribution along the axial direction of the primer, assuming a constant primer thickness.

According to some aspects, at least part of the adhesive primer layer 5 comprises the particles 7 of a low resistivity material and at least part of the adhesive primer layer 5 is free of the particles 7 of a low resistivity material. It should be notes that in the method described below, the part of the adhesive primer layer 5 comprising the particles is called the first adhesive primer layer 5 and the part which is free of particles is called the second adhesive primer layer 5. This is only a way to name them to distinguish between the parts with or without the particles. The particles 7 of a low resistivity material are according to some aspects present in the ends of the elongated core 2. In the ends of the insulator, where fittings may be arranged, there may be a transition from insulating material to a metal material, a transition from ground potential or a transition to a conductor potential. In this area the electric field strength in an insulator is especially affected. Using an adhesive primer layer 5 infused with particles 7 of a low resistivity material in this area stabilizes the electric field and reduces discharges.

According to some aspects, wherein the surface resistivity of the adhesive primer layer 5 comprising particles 7 of a low resistivity material is between $10^8$ and $10^{14}$ Ω/square, and preferably between $10^{10}$ and $10^{12}$ Ω/square. The resistivity should not be so low that the leakage current causes too large losses or local heating, but should be low enough to affect the electric fields of the insulator. According to some aspects, the particles of the low resistivity material comprises particles of any of, or a combination of: $Cr_2O_3$ iron oxides ($Fe_2O_3$, $Fe_3O_4$), $TiO_2$, ZnO, ZnO microvaristors, SiC, CuO, Carbon Black, graphene/graphite oxide and thermally reduced graphene/graphite oxide. The resistivity of the adhesive primer layer 5 can be adjusted by both changing the low resistivity material and changing the amount of particles 7 of a low resistivity material. Thus, an adhesive primer layer 5 can display the same resistivity but with different particles 7 of a low resistivity material and with different amount of particles. An advantage of a material with field dependent resistivity that are reduced with an increased field is that the material will suppress high fields.

The proportion of particles 7 of a low resistivity material in the adhesive primer layer 5 is, according to some aspects, high enough for creating a percolated particle network and <40 vol %. Again, the proportion will depend on the low resistivity material chosen.

There is a relationship between the thickness of the adhesive primer layer 5 and the proportion of particles 7 of a low resistivity material. To reach a desired electric field profile for the insulator, a thin layer with a higher proportion of particles may give the same electric field profile as a thicker layer with a lower proportion of particles. A thin layer may be desirable for materials savings reasons but then there might be a need for such a high proportion of particles 7 of a low resistivity material so that the adhesion properties are not good enough for robustly adhering the protective layer 3. So, according to some aspects, when designing the insulator, the proportion of particles 7 of a low resistivity material and the thickness of the adhesive primer layer 5 will be jointly determined. According to some aspects, the adhesive primer layer 5 has a thickness of between 0.01 and 500 micrometer, and preferably between 0.1 and 100 micrometer There are many different coupling agents 6. The requirements for a coupling agent 6 used in an insulator is that it is non-conductive and that it provides good adhesion. According to some aspects, the coupling agent 6 comprises at least one of: silanes, titanates, orthosilicate esters or metal orthoesters. Commonly used organosilanes for binding silicone rubber to various substrates are methacryloxypropyltrimethoxysilane, 3-aminopropyltriethoxysilane, allyltrimethoxysilane or polyvinylmethoxysiloxane polymers. Silanes are, for example, used as coupling agents 6 to adhere fibers such as glass fibers and carbon fibers to certain polymer matrices, thus stabilizing the composite material.

The protective layer 3 comprises a high resistivity material such that it is not conducting in the insulator. The protective layer 3 material is chosen depending on characteristics. The protective layer 3 comprises, according to some aspects, a high resistivity polymeric base material. The resistivity of the high resistivity material is between $10^{11}$ and $10^{16}$ Ωm, and preferably between $5*10^{12}$ and $10^{15}$ Ωm. The resistivity of the polymeric base material can be tuned by the amount, distribution and surface treatment of inorganic filler particles, such as silica and aluminium trihydrate, ATH.

The protective layer 3 comprises, according to some aspects, silicone rubber. Silicone rubber has good resistance to extreme temperatures and operate normally from −55 to 300° C. Silicone rubber also offers high tear strength and high dielectric strength at high voltage. Silicone rubber is also hydrophobic, which is useful when the insulator is used in an environment where it can get wet, for example by rain. When dirt and/or water collects on the sheds, electrical discharges can happen between the sheds and the silicone rubber then erodes. The silicone rubber can for example be filled with a flame retardant, ATH, which increases the resistance to electrical erosion.

The core gives robustness, stiffness and strength to the insulator. It may also be quite large and thus easily becomes heavy to handle. The elongated core 2 is, according to some aspects, hollow and insulating. According to some aspects, the elongated core 2 comprises a glass fiber reinforced composite tube. A glass fiber reinforced composite tube is a light weight, robust and cheap insulating elongated core 2.

Figure 3A:
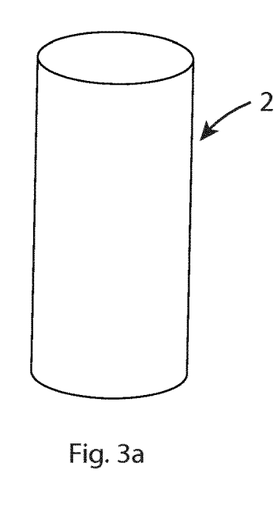
FIG. 3a-c illustrates different shapes of the elongated core.
Figure 3B:
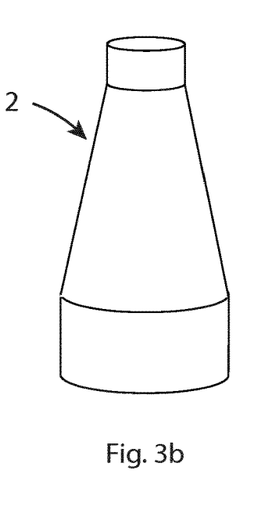
Figure 3C:
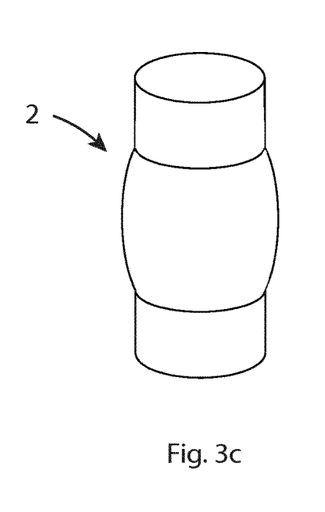

The insulating elongated core 2 comprises, according to some aspects, different diameters along the elongation. Different examples can be seen in FIGS. 3*a*, 3*b* and 3*c*. In one example, the insulating elongated core 2 comprises two cylindrical parts with different diameters and a conical part between the two parts to connect them, as shown in FIG. 3*b*. According to some aspects, the insulating elongated core 2 with different diameters along the elongation is hollow and comprises for example glass fiber reinforced composite tube as described above.

Figure 4:
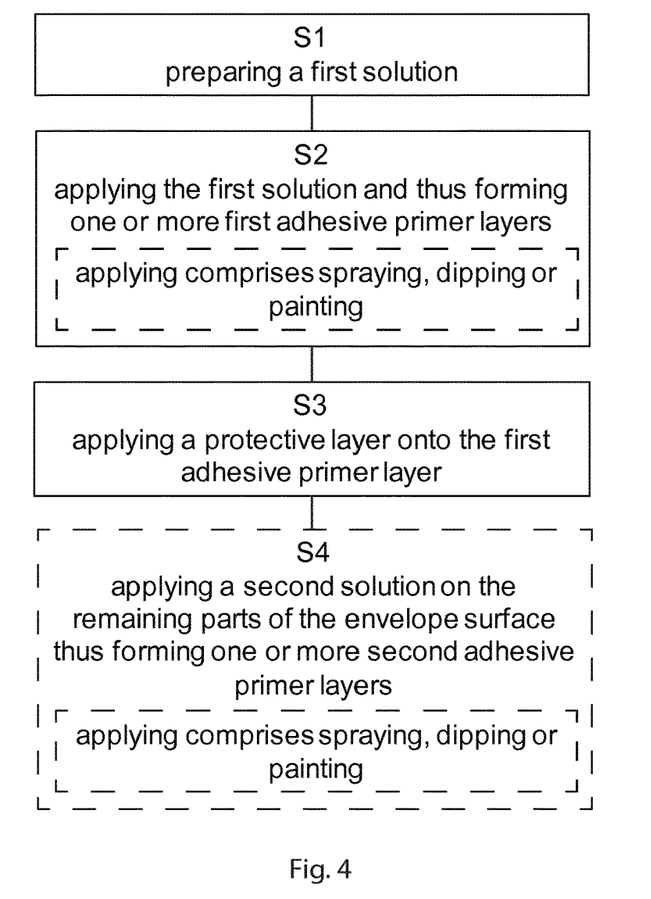
FIG. 4 shows a block diagram of the method.

FIG. 4 shows a block diagram of a method for producing a composite insulator 1. The method comprises preparing a first solution comprising a solvent, a coupling agent 6 and particles 7 of a low resistivity material, applying the first solution on at least a part of an envelope surface of an insulating elongated core 2 and thus forming one or more first adhesive primer layers 5 and applying a protective layer 3 onto the first adhesive primer layer 5 on the elongated core 2, wherein the protective layer 3 comprises an outer surface 4 with a shed profile. This method provides an efficient method, without many and/or complicated steps, for producing the composite insulator 1 discussed above. The advantages and alternatives of the resulting composite insulator 1 have been previously discussed. Alternatives for the coupling agent 6 and the elongated core 2 has also been discussed above when discussing the composite insulator 1. The solvent is used so that the adhesive primer layer 5 is easy to apply and the solvent is evaporated before applying the protective layer 3. Examples of solvents that can be used are methanol, ethanol, isopropanol, water, volatile cyclic PDMS oligomers, heptane. The above values for the adhesive primer layer 5 is for when the layer has dried.

As said, the solvent is used so that the adhesive primer layer 5 is easy to apply. According to some aspects, applying the first solution comprises spraying, dipping, or painting the first solution onto the envelope surface of the elongated core 2. Spraying, dipping or painting are efficient and simple methods to apply the first adhesive primer layer 5 which does not require any complicated or expensive equipment. It is common to apply a primer layer onto substrates for obtaining a good adhesion between the primed layer and the insulating silicone rubber. By combining coupling agents and conductive particles in the same primer you simultaneously obtain a good adhesion as well as a desired resistivity during one processing step.

As also explained above, in some uses there may not be a need for particles 7 of a low resistivity material in the adhesive primer layer 5 over the whole elongated core 2. According to some aspects, the first solution is applied on one or more parts of the envelope surface. Thus, the particles 7 of a low resistivity material are present in the adhesive primer layer 5 that is applied in one or more parts of the elongated core 2. In this case, the method comprises applying a second solution, the second solution comprising the solvent and the coupling agent 6 and is without the particles 7 of a low resistivity material, on the remaining parts of the envelope surface thus forming one or more second adhesive primer layers 5 and wherein the protective layer 3 is applied onto the first and second adhesive primer layers 5. Thus, there is adhesive primer layer over the whole envelope surface and at least one part of the adhesive primer layer 5, i.e. the first adhesive primer layer 5, comprises particles 7 of a low resistivity material and at least one part of the adhesive primer layer 5, i.e. the second adhesive primer layer 5, does not comprise any particles 7 of a low resistivity material. It should be noted that the term "whole cylindrical surface" and "remaining parts" means the parts where the protective layer 3 will be placed and may exclude some part in the ends. The ends may for example be cut off after production or be used to fasten the insulator upon installation and does then not need any adhesive primer layer 5.

When there is adhesive primer layer 5 both with and without particles 7 of a low resistivity material, i.e. the first and second adhesive primer layer 5, the first and second adhesive primer layers 5 are applied separately. Both layers may be applied in the same way so, according to some aspects, applying the second solution comprises spraying, dipping or painting the second solution onto the envelope surface of the elongated core 2. Hence, when there is adhesive primer layer 5 over the whole surface of the elongated core 2, some parts with particles 7 of a low resistivity material and some parts without, and the different parts can be applied separately with for example spraying or painting.

Figure 5:
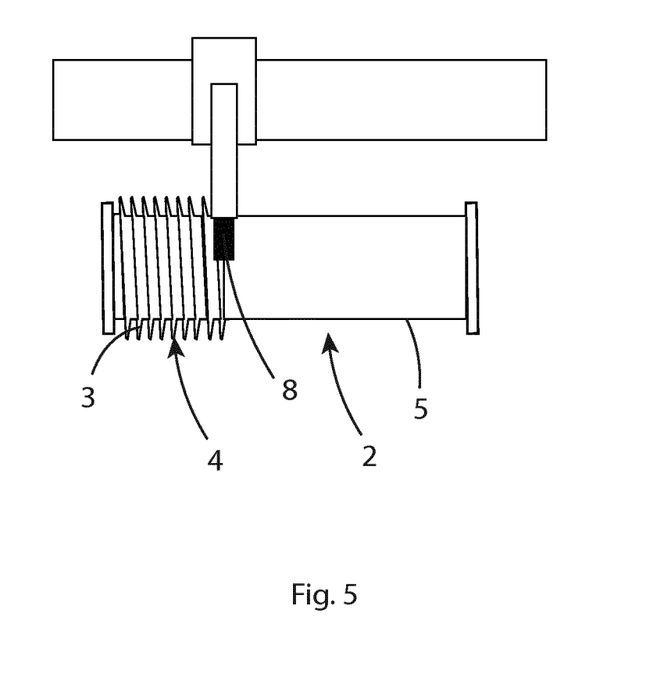
FIG. 5 illustrates an extrusion process for applying a protective layer to the elongated core.

There are different ways to apply the protective layer 3; for example, molding or through an extrusion process. FIG. 5 illustrates an example of an extrusion process. According to some aspects, applying the protective layer 3 comprises extruding the protective layer 3, through an elongated nozzle 8, in a helical shape around the elongated core 2 and thus forming a continuous layer with an outer surface 4 with a shed profile. In today's helical extrusion process, silicone is continuously fed into an extruder where the material is plasticized and pushed through a nozzle. Nozzles with different shapes can easily be exchanged in order to produce different shed geometries. According to an aspect of the disclosure, the extruded profile is then pressed against the rotating composite core, or in other words composite tube, previously coated with the adhesive primer layer 5 to ensure good adhesion and to design a desirable electric field profile. By moving the extruder along the tube, a helical shed profile is obtained. After extrusion the complete insulator is moved to a hot air oven for crosslinking of the silicone into a rubber.

According to some aspects, the composite insulator 1 comprises top and bottom metal end fittings, i.e. flanges. The fittings are for example made of aluminum. The layer comprising particles of low resistivity is, according to some aspects, electrically contacted to the metallic flange both at the bottom and the top of the insulator. A possibility for providing such a connection is to use a low resistive glue or a low resistive tape for connecting the insulator to the flanges so that the glue or tape bridges the gap between the low resistivity layer and the flange. The glue could be an epoxy with low resistivity. A possibility to further reduce the resistivity of an epoxy based glue is to fill with low resistive particles, for example the same type of particles as used in the adhesive primer layer above. The glue could also be filled with metallic particles such as silver particles.

An example of a composite insulator 1 according to above is a glass fiber reinforced composite tube coated with an adhesive primer prior to the extrusion of the protective layer 3, to ensure excellent adhesion of the silicone rubber. A slightly conductive filler is added to the primer, in order to obtain a thin low resistivity adhesive primer layer 5. High resistivity silicone is then extruded on top of this layer. An alternative for the high resistivity silicone is to add it onto the internal structure using injection molding or casting.

In the following, a second embodiment of a composite insulator 1 is disclosed. The second embodiment shares all features, where applicable, with the composite insulator 1 and manufacturing method as disclosed above except for that the particles 7 of a low resistivity material is now not present in the adhesive primer layer 5, but in the base of the protective layer 3. In other words, in the embodiment below, the electric field influencing particles 7 of a low resistivity material is now mixed in with the high resistivity base material of the protective layer 3 at the base of the protective layer 3 instead of being mixed into the adhesive primer layer 5.

Aspect 1. A second composite insulator, comprising:
an insulating elongated core 2;
a protective layer 3 surrounding the elongated core 2, the protective layer 3 comprising an outer surface 4 with a shed profile, wherein the shed profile comprises shed tips, and wherein the protective layer 3 comprises a high resistivity base material; and
an adhesive primer layer 5 disposed between the elongated core 2 and the protective layer 3 for adhering the protective layer 3 to the elongated core 2;
wherein the protective layer 3 comprises a first part, the part closest to the adhesive primer layer 5, which has a lower resistivity than a second part, the part closes to the shed tips.

Aspect 2. The second composite insulator according to aspect 1, wherein the first part comprises particles 7 of a low resistivity material and the second part is free of the particles of the low resistivity material.

Aspect 3. The second composite insulator according to aspect 1 or 2, wherein the protective layer 3 has a total thickness from the part abutting the adhesive primer layer 5 to the shed tips, and wherein the first part comprising the particles 7 of a low resistivity material comprises at least 1% of the total thickness and wherein the second part, free of particles 7 of a low resistivity material, comprises at least 1% of the total thickness.

Aspect 4. The second composite insulator according to any of aspects 1 to 3, wherein the second composite insulator is a bushing for high-voltage direct current, HVDC, applications, and wherein the particles 7 of a low resistivity material are distributed evenly in the first part.

Aspect 5. The second composite insulator according to any of aspects 1 to 3, wherein the first part extends axially through the whole protective layer 3 or through at least one part of the protective layer 3.

Aspect 6. The second composite insulator according to any of aspects 1 to 5, wherein the surface resistivity of the first part of the protective layer 3, comprising particles 7 of a low resistivity material, is between $10^{10}$ and $10^{13}$ $\Omega$m, and preferably between $10^{11}$ and $5 \cdot 10^{12}$ $\Omega$m. The surface being the surface of the first part towards the second part of the protective layer.

Aspect 7. The second composite insulator according to any of aspects 1 to 6, wherein the resistivity of the second part of the protective layer 3, without particles 7 of a low resistivity material is lower than the resistivity of the first part.

Aspect 8. The second composite insulator according to any of aspects 1 to 7, wherein the particles of the low resistivity material comprises particles of any of, or a combination of: $Cr_2O_3$, iron oxides, $TiO_2$, ZnO, ZnO microvaristors, SiC, CuO, Carbon Black, graphene/graphite oxide and thermally reduced graphene/graphite oxide.

Aspect 9. The second composite insulator according to any of aspects 1 to 8, wherein the proportion of particles 7 of a low resistivity material in the first part of the protective layer 3 is high enough for creating a percolated particle network and <40 vol %.

Aspect 10. The second composite insulator according to any of aspects 1 to 9, wherein the total thickness of the adhesive primer layer 5 is between 0.01 and 500 micrometer, and preferably between 0.1 and 100 micrometer.

Aspect 11. The second composite insulator according to any of aspects 1 to 10, wherein the protective layer 3 comprises a high resistivity polymeric base material.

Aspect 12. The second composite insulator according to aspect 11, wherein the protective layer 3 comprises silicone rubber.

Aspect 13. The second composite insulator according to any of aspects 1 to 12, wherein the elongated core 2 comprises a glass fiber reinforced composite tube.

Aspect 14. A method for producing a second composite insulator, the method comprises:
- preparing a solution comprising a solvent and a coupling agent 6;
- applying the solution on at least a part of an envelope surface of an insulating elongated core 2 and thus forming one or more adhesive primer layers 5; and
- applying a protective layer 3 onto the adhesive primer layer 5 on the elongated core 2 by an extrusion process, wherein the protective layer 3 comprises a high resistivity base material and an outer surface 4 with a shed profile, the protective layer 3 comprises a first part, the part closest to the adhesive primer layer 5, which comprises particles 7 of a low resistivity material and a second part, the part closes to the shed tips, which is free of particles 7 of a low resistivity material;
- wherein the extrusion process comprises co-extruding, with at least one elongated nozzle, high resistivity base material mixed with particles 7 of a low resistivity material and high resistivity base material without particles 7 of a low resistivity material.

Aspect 15. The method according to aspect 14, wherein co-extruding comprises extruding high resistivity base material mixed with particles 7 of a low resistivity material at a side of the elongated nozzle that extrudes at the adhesive primer layer 5 and extruding high resistivity base material without particles 7 of a low resistivity material at a side of the elongated nozzle which extrudes the shed tips.

Aspect 16. The method according to aspect 14, wherein co-extruding comprises an elongated nozzle subdivided into two separated parts, a first part extruding high resistivity base material mixed with particles 7 of a low resistivity material at a side of the elongated nozzle that extrudes at the adhesive primer layer 5 and a second part extruding high resistivity base material without particles 7 of a low resistivity material at a side of the elongated nozzle which extrudes the shed tips.

In the following, further embodiments of a composite insulator 1 are disclosed. The embodiments share all features, where applicable, with the composite insulator 1 and manufacturing method as disclosed above except for that the particles 7 of a low resistivity material is now not present in the adhesive primer layer 5, but in a low resistivity layer disposed between the elongated core and the primer layer. In other words, in the embodiments below, the electric field influencing part of the disclosure is in a low resistivity layer disposed between the elongated core and the primer layer. With this approach, a low resistive layer giving a favorable field distribution along the axial direction of the elongated core and a primer layer providing good adhesion properties towards the protective layer is provided. The low resistive layer can be built up from a few different types of materials, some examples listed below:

Painting a thick 'conductive layer' on the insulator, i.e. the elongated core. In this example, a paint (epoxy, polyester or polyurethane based) filled with low resistive particles according to above can be used. The adhesive primer layer without the particles of low resistivity is then applied on top of the conductive paint. The paint thickness of the paint is 50 to 300 µm and preferable 100 to 200 µm thick.

Using a conductive outer liner of polyester fibers and epoxy/vinylester/polyester resin filled with low resistivity particles according to above, or veil of polyester or glass fibers filled with low resistive particles impregnated with a thermoset resin, on the outer surface of the elongated core. The adhesive primer without low resistivity particles is applied on top of the conductive outer liner. The liner thickness is 50 µm to 1000 µm and preferable 100 to 300 thick.

The top and bottom aluminum end fittings, i.e. flanges, are connected by conductive adhesive tape filled with low resistive particles, wound or taped on to the elongated core prior the adhesive primer is applied. The tape thickness is 5 to 500 µm and preferable 50 to 100 µm thick. For example, conductive Acrylic tape filled with $Cr_2O_3$ iron oxides, such as $Fe_2O_3$ or $Fe_3O_4$, $TiO_2$, ZnO, ZnO microvaristors, SiC, CuO, Carbon Black, graphene/graphite oxide and thermally reduced graphene/graphite oxide may be used. The tape is connected to both end fittings. The tape is either continuous between the end fittings or there are several tapes. The tape is, according to some aspects, applied in a wound spiral pattern or as several stripes directly across the elongated tube. The tape is according to some aspects applied to cover the whole surface of the elongated tube or such that there is a gap between the tapes.

Winding or taping of carbon fibers or carbon fibers/thermoset prepreg on the elongated core before applying the adhesive primer. The carbon fibers are low resistive and no adding of particles of low resistivity is needed. The amount of carbon fibers is chosen to give a chosen surface resistivity.

All type of conductive layers has a surface resistivity in the range $10^8$ and $10^{14}$ Ω/square, and preferably between $10^{10}$ and $10^{12}$ Ω/square. It should be noted that the tapes described above can be wound in any pattern over the elongated core.

REFERENCE LIST 1. composite insulator
2. elongated core
3. protective layer
4. outer surface, with a shed profile
5. adhesive primer layer
6. coupling agent
7. particles of a low resistivity material

The invention claimed is:

1. A composite insulator, comprising:
   an insulating elongated core;
   a protective layer of a high resistivity material surrounding the elongated core, the protective layer comprising an outer surface with a shed profile; and
   an adhesive primer layer disposed between the elongated core and the protective layer for adhering the protective layer to the elongated core, the adhesive primer layer comprising a coupling agent and particles of a low resistivity material;
   wherein at least part of the adhesive primer layer comprises the particles of a low resistivity material and at least part of the adhesive primer layer is free of the particles of a low resistivity material.

2. The composite insulator according to claim 1, wherein the surface resistivity of the adhesive primer layer comprising particles of a low resistivity material is between $10^8$ and $10^{14}$ Ω/square, and preferably between $10^{10}$ and $10^{12}$ Ω/square.

3. The composite insulator according to claim 1, wherein the particles of the low resistivity material comprise particles of any of, or a combination of: $Cr_2O_3$ iron oxides ($Fe_2O_3$, $Fe_3O_4$), $TiO_2$, ZnO, ZnO microvaristors, SiC, CuO, Carbon Black, graphene/graphite oxide and thermally reduced graphene/graphite oxide.

4. The composite insulator according to claim 1, wherein the coupling agent comprises at least one of: silanes, titanates, orthosilicate esters or metal orthoesters.

5. The composite insulator according to claim 1, wherein the proportion of particles of a low resistivity material in the adhesive primer layer is high enough for creating a percolated particle network and <40% by volume.

6. The composite insulator according to claim 1, wherein the adhesive primer layer has a thickness of between 0.01 and 500 micrometer, and preferably between 0.1 and 100 micrometer.

7. The composite insulator according to claim 1, wherein the protective layer comprises a high resistivity polymeric base material.

8. The composite insulator according to claim 7, wherein protective layer comprises silicone rubber.

9. The composite insulator according to claim 1, wherein the elongated core comprises a glass fiber reinforced composite tube.

10. A method for producing a composite insulator, the method comprises:
    preparing a first solution comprising a solvent, a coupling agent and particles of a low resistivity material;
    applying the first solution on at least a part of an envelope surface of an insulating elongated core and thus forming one or more first adhesive primer layers;
    applying a second solution, the second solution comprising the solvent and the coupling agent and is without the particles of a low resistivity material, on the remaining parts of the envelope surface thus forming one or more second adhesive primer layers; and
    applying a protective layer of a high resistivity material onto the first and second adhesive primer layers on the elongated core, wherein the protective layer comprises an outer surface with a shed profile.

11. The method according to claim 10, wherein applying the first solution comprises spraying, dipping or painting the first solution onto the envelope surface of the elongated core.

12. The method according to claim 10, wherein applying the second solution comprises spraying, dipping or painting the second solution onto the envelope surface of the elongated core.

* * * * *